United States Patent
Li et al.

(10) Patent No.: US 9,252,843 B2
(45) Date of Patent: Feb. 2, 2016

(54) METHOD AND APPARATUS FOR DATA TRANSMISSION

(75) Inventors: Wei Li, Shanghai (CN); Jun Yu, Shanghai (CN); Gang Zhang, Shanghai (CN)

(73) Assignee: Shanghai Fudan Microelectronics Group Company Limited (CN)

( * ) Notice: Subject to any disclaimer, the term of this patent is extended or adjusted under 35 U.S.C. 154(b) by 233 days.

(21) Appl. No.: 13/881,591

(22) PCT Filed: Oct. 27, 2010

(86) PCT No.: PCT/CN2010/078134
§ 371 (c)(1),
(2), (4) Date: Apr. 25, 2013

(87) PCT Pub. No.: WO2012/055094
PCT Pub. Date: May 3, 2012

(65) Prior Publication Data
US 2013/0217328 A1    Aug. 22, 2013

(51) Int. Cl.
*H04B 5/00*     (2006.01)
*H04L 29/06*    (2006.01)
*H04W 4/00*     (2009.01)
*H04W 80/02*    (2009.01)

(52) U.S. Cl.
CPC ............ *H04B 5/0025* (2013.01); *H04B 5/0031* (2013.01); *H04L 63/0492* (2013.01); *H04W 4/008* (2013.01); *H04W 80/02* (2013.01)

(58) Field of Classification Search
CPC ............... H04B 5/0025; H04B 5/0031; H04L 63/0492; H04W 4/008; H04W 80/02
See application file for complete search history.

(56) References Cited

U.S. PATENT DOCUMENTS

| 8,761,665 B2* | 6/2014 | Lee ..................... H04M 1/7253 455/41.1 |
| 2010/0045425 A1* | 2/2010 | Chivallier ............ A61B 5/0002 340/5.8 |
| 2010/0252631 A1 | 10/2010 | Kargl |
| 2012/0001725 A1* | 1/2012 | Chen .............................. 340/5.6 |
| 2012/0021683 A1* | 1/2012 | Ma ..................... G06Q 20/3278 455/41.1 |

(Continued)

FOREIGN PATENT DOCUMENTS

| CN | 101103582 A | 1/2008 |
| CN | 101136078 A | 3/2008 |

(Continued)

*Primary Examiner* — David Bilodeau
(74) *Attorney, Agent, or Firm* — Blank Rome LLP

(57) ABSTRACT

A method and an apparatus for data transmission between a contactless front element and a security element are provided. The method includes: the contactless front element transparently transmits first data obtained from a contactless identification device to the security element through a single wire connection; the security element processes the first data to generate second data; the contactless front element transparently transmits the second data obtained from the security element through the single wire connection to the contactless identification device. Compared with the prior art, the method can transmit the contactless data in real time between the contactless front element and the security element. Thus the security element can directly respond instructions sent by a proximity coupling device during simulating Proximity Integrated Circuit Card, so that the contactless front element becomes a transparent transport channel, the time order compatibility problem can be avoided, and the safety problem can be surmounted.

15 Claims, 5 Drawing Sheets

(56) References Cited

U.S. PATENT DOCUMENTS

2012/0178365 A1* 7/2012 Katz et al. .................... 455/41.1
2013/0072255 A1* 3/2013 Levionnais et al. ......... 455/552.1
2014/0227972 A1* 8/2014 Swaminathan ...... H04B 5/0031
455/41.1

FOREIGN PATENT DOCUMENTS

| CN | 101334913 A | 12/2008 |
| CN | 101621469 A | 1/2010 |
| CN | 201508570 U | 6/2010 |

* cited by examiner

METHOD AND APPARATUS FOR DATA TRANSMISSION

CROSS-REFERENCE TO RELATED APPLICATIONS

The present application is a Section 371 National Stage Application of International Application No. PCT/CN2010/078134.

FIELD OF THE DISCLOSURE

The present disclosure generally relates to near field communication technology field, and more particularly, to a method and an apparatus for data transmission between a contactless front element and a security element in near field communication.

BACKGROUND

Mobile contactless application based on a mobile communication device is currently an active application field on both technology and market, among which Near Field Communication (NFC) technology is a typical representative. NFC technology has developed for several generations, and relative technical standards and application specifications (such as ISO18092 or ISO21481) are becoming more and more mature. However, relative products land on the market much more slowly than expectation. The reasons for the slow entry include complicated application and business models caused by a long industrial chain in NFC technology. Additionally, Single Wire Protocol (SWP) used in the conventional solutions has a bad compatibility with technologies in existing contactless application systems, which becomes a main obstacle in technical level. Technical details about SWP have been described in Chinese patent publication No. CN 101103582A.

Electronic payment service has gone deep into our life and brought us much convenience. In fixed business sites, electronic payment service based on Proximity Integrated Circuit Card (PICC) has developed mature solutions and stable markets. Along with the development of applications, it is desired that PICC is applied in mobile communication devices. For example, it is expected to have display functions to inquire data inside PICC and to have communication functions for communicating with a backend server to realize some functions like remote recharging of an electronic wallet. In other words, a cell phone is expected to be a kind of PICC. Therefore, a new product combining a PICC, a Proximity Coupling Device (PCD) and a cell phone terminal together based on NFC appeared in 2004.

As a result of technological development and standardization, technical standards and application specifications relative to NFC are more mature than ever. However, products based on NFC have not landed on the market yet. One major limitation lies in that characteristics of a PICC can not be reflected completely, although a NFC device has realized an emulation of a PICC in function. Especially, the requirement that the NFC device should be compatible with characteristics of the PICC used in legacy application systems causes a stricter condition to land on the market for some tremendously influential contactless applications already in use. For example, public transportation systems and micropayment systems need to modify installed equipment, such as Point-Of-Sale (POS) machine, which thereby bring about high change costs and business costs. Therefore, terminal device manufacturers are not motivated to provide cell phone terminals supporting NFC, brand new designed products, because of a lack of a mature application environment, which thereby slows progresses of practical application popularization of NFC.

In substance, NFC is an application of PICC, with a carrier of a PICC changed. From the view of structures, NFC is realized by employing a dual element architecture, e.g., a combination of a ContactLess Front (CLF) element and a Security Element (SE) as shown in FIG. 1. The contactless front element is configured to process a contactless Radio Frequency (RF) interface and a communication protocol. The security element is configured to process applications and data management of PICC. Advantages of the architecture are as follows.

1) Separated card and station may be realized easily by employing a dual element architecture of contactless front element and security element. The contactless front element is integrated in a NFC terminal to realize a complete contactless RF interface. PICC applications deal with many security requirements. Before entering an application step, a PICC needs to be issued and managed. The security element, separated from the NFC terminal, can be independently issued and is easily compatible with existing systems in management.

2) The PICC is always a closed application environment. A same type of PICC in different regions or different applications may have different initial configuration. Under an architecture of contactless front element and security element, a general NFC terminal can be arranged with different security element to realize different application demands.

3) The contactless front element and its RF antennas are integrated on the NFC terminal, thereby facilitating a consistent contactless RF interface.

The NFC terminal realizes an emulation of a PICC through a combination of the contactless front element and the security element, where a connection interface needs to be defined between the contactless front element and the security element. As shown in FIG. 2, for a NFC terminal scheme, the security element is generally realized by a SIM (Subscriber Identity Module) card and an interface therein is a Single Wire Protocol (SWP) interface. A SIM card security element supporting a SWP interface is called SWP SIM, which communicates with the contactless front element through the C6 pin of the SIM card to realize a NFC function.

The NFC standard ISO18092, supporting the emulation of a PICC, is built on the standard ISO14443. Since the SWP interface has defined a complete set of communication protocols, when ISO14443 protocol data packets are transmitted between the security element and the contactless front element, the ISO14443 data packets need to be converted into packets satisfying the SWP protocol, and a Logical Link Control (LLC) layer and a Medium Access Control (MAC) layer need to be added. The converted data packets, the LLC layer and the MAC layer form a SWP data frame, as shown in FIG. 3.

When frame data following ISO18092 or ISO14443 is converted into Contactless Tunnelling (CLT) frames, five bytes are added, including Start-Of-Frame (SOF), LLC control field, Cyclic Redundancy Check (CRC) 16 and End-Of-Frame (EOF). Under a speed of SWP 848 Kbps, the smallest delay of an ideal reception and sending is still more than 113 μs. The more the application data is, the more the delay is.

A contactless application layer protocol defined by ISO14443-4 has no strict requirement on response time. Therefore, the SWP interface can realize an emulation of a PICC while the overtime of a proximity coupling device waiting for responses should be set relatively longer to avoid a problem of compatibility, which is a first problem that the SWP interface needs to face.

According to requirement of ISO14443-3, the command sets of request, wake-up, anticollision, and select have been defined that the minimum response time of a PICC to a proximity coupling device is 1172/Fc (Fc being an external field clock frequency, 13.56 MHz), namely, 86 µs in time. Even if using a standard limit speed of the SWP interface in addition to data processing time in elements, the time required is far greater than 86 µs. Therefore, these commands can not be realized through the SWP interface in time. In existing NFC solutions, commands of ISO14443-3 are responded directly by the contactless front element; when it comes to ISO14443-4 protocol, the proximity coupling device is responded by the security element through the SWP interface.

An emulation of a PICC realized in this manner is similar to a general PICC in function except for a little increment of delay. However, there is a relatively serious problems underlying. Commands defined in ISO14443-3 may process UID of a PICC. In many legacy systems, UID is a very important factor to be used to disperse the key, which realize the one-card-one-key management. When protocol ISO14443-3 is completed by the contactless front element, it is the contactless front element that informs the UID to the proximity coupling device. Therefore, when the SWP SIM card is put into the NFC terminal, the UID of the SWP SIM card needs to be transmitted to the contactless front element and saved therein through a synchronous operation. UID of a common Integrated Circuit (IC) card is not allowed to be modified after leaving the factory, and IC manufacturers and operating agencies have drafted various regulations to ensure the uniqueness of UID. Due to an architecture of separated card and station, different SWP SIM cards may be put into a same NFC terminal, which means that UID of the contactless front element should be modifiable. Once the UID is modified, UID's uniqueness management will face a major challenge, which will lead to confusing account management of some application systems, lower security of the system, such as lowering the difficulty in cloning the card.

In conclusion, although SWP SIM has become a main solution in NFC communication and corresponding technical standards have also been drafted, problems of delay in a SWP interface and a UID management deriving therefrom may have some influences on further development of NFC. Therefore, a more effective solution is desired.

SUMMARY

Embodiments of the present disclosure provide a method to reduce communication delay between a contactless front element and a security element in a NFC terminal and to improve security and time sequence compatibility caused by storing UID of the security element in the contactless front element.

One embodiment of the present disclosure provides a method for data transmission. The method may include following steps: a contactless front element transparently transmits first data, which is obtained from a proximity coupling device, to a security element through a single wire connection; the security element processes the first data to generate second data; the contactless front element transparently transmits the second data, which is obtained from the security element through the single wire connection, to the proximity coupling device.

Optionally, the method may further include: the contactless front element obtaining modulated first data from the proximity coupling device through RF signals.

Optionally, the method may further include: generating coded signals, which include complete real-time contactless information, through logically processing field clock signals and demodulated first data generated by a clock recovery and demodulation circuit in the contactless front element, and transparently transmitting the coded signals to the security element.

Optionally, the method may further include: the contactless front element transmitting the second data to the proximity coupling device through RF signals.

Optionally, the method may further include: the contactless front element modulating signals of the second data to obtain modulated second data and transmitting the modulated second data to the proximity coupling device.

Optionally, the transparent transmission may be a real-time transmission.

Optionally, data transmitted between the contactless front element and the security element are synchronous to data transmitted between the contactless front element and the proximity coupling device.

One embodiment of the present disclosure provides a data transmission apparatus. The apparatus may include: a contactless front element and a security element connected with the contactless front element through a single wire. The contactless front element may be configured to transparently transmit data between the security element and an external proximity coupling device.

Optionally, the transparent transmission may be a real-time transmission.

Optionally, data transmitted between the contactless front element and the security element are synchronous to data transmitted between the contactless front element and the external proximity coupling device.

Optionally, a fixed delay of the contactless front element may meet the requirement of frame delay time between a proximity coupling device and a PICC, following the contactless standard.

Optionally, the contactless front element may include a first signal generating element and a second signal demodulation element. The security element may include a first signal demodulation element and a second signal generating element. The output port of the first signal generating element, the input port of the second signal demodulation element, the input port of the first signal demodulation element and the output port of the second signal generating element are electrically connected.

Optionally, the first signal generating element may include a clock recovery and demodulation circuit and a logic processing circuit. Two output ports of the clock recovery and demodulation circuit may be connected with two input ports of the logic processing circuit respectively. An output port of the logic processing circuit may be the output port of the first signal generating element.

Optionally, the security element may further include a main processing element. An output port of the first signal demodulation element may be connected with an input port of the main processing element and an output port of the main processing element may be connected with an input port of the second signal generating element.

Compared with conventional solutions, the method for data transmission in the present disclosure can transmit contactless data between a contactless front element and a security element in real time. A combination of the contactless front element and the security element may realize the function of PICC. Therefore, delay caused by an interface between the contactless front element and the security element is less than the minimum predetermined time from an ending of proximity coupling device frame data to a beginning of the PLCC frame data. By means of the real-time transmission, time sequence characteristics emulated by the contactless front-security element architecture are in accord with time sequence characteristics of the standard PICC, which improves application compatibility.

Furthermore, the present disclosure improves UID management. UID does not need to be transmitted from the security element to the contactless front element in advance. Instead, the security element responds to the proximity coupling device directly. In the real-time transmission for data in reception and response of a contactless interface, interface transmission delay may be controlled strictly and the security element may directly response to commands sent by the proximity coupling device during a PICC emulation process. In this manner, the contactless front element completely becomes a transparent transmission channel, which not only realizes station and card separation solution, but also high contactless compatibility in NFC.

Furthermore, in the data transmission apparatus of the present disclosure, the interface between the contactless front element and the security element is formed on one pin, thus the interface can share one pin of a SIM card with SWP. In this manner, a security element can be formed in the SIM card and there is no conflict with other conventional standards. Additionally, a single wire interface has good expansibility and can be easily extended to be, besides a security element of SIM, a multiplex interface supporting multiplex security element to form an architecture of separated card and station with multiple cards for multiple purposes.

Furthermore, the present disclosure may employ the contactless standard communication protocol (for example, ISO14443) directly and becomes a feasible and efficient contactless transmission standard.

BRIEF DESCRIPTION OF THE DRAWINGS

A further understanding of the purposes, characteristics and advantages of the present disclosure may be realized by reference to detailed description of embodiments of the present disclosure shown in the drawings wherein like reference numerals are used throughout all the drawings to refer to similar components. The drawings are not zoomed with geometric proportion to real sizes intentionally and they mainly describe the main purpose of the present disclosure.

DETAILED DESCRIPTION OF THE DISCLOSURE

In order to clarify the present disclosure, embodiments of the present disclosure will be described in detail as follows. However, the present disclosure can be realized with reference to other embodiments different from the embodiments described herein. Those skilled in the art can modify and vary the embodiments without departing from the spirit and scope of the present disclosure. Accordingly, the present disclosure is not restricted to the embodiments described.

Hereafter, embodiments of present disclosure will be described in detail in conjunction with accompanying drawings.

Figure 1:
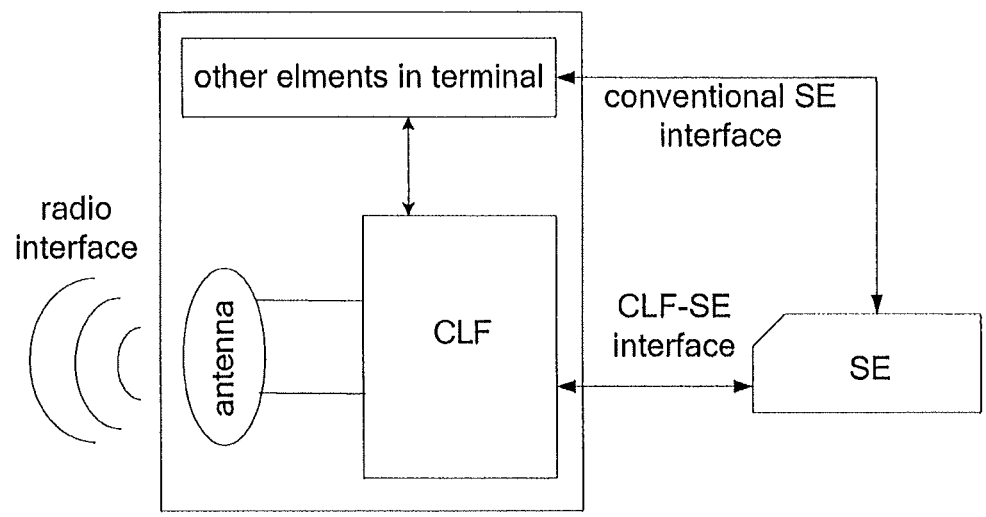
FIG. 1 schematically illustrates a combinational architecture of a contactless front element and a security element in a conventional solution.
Figure 2:
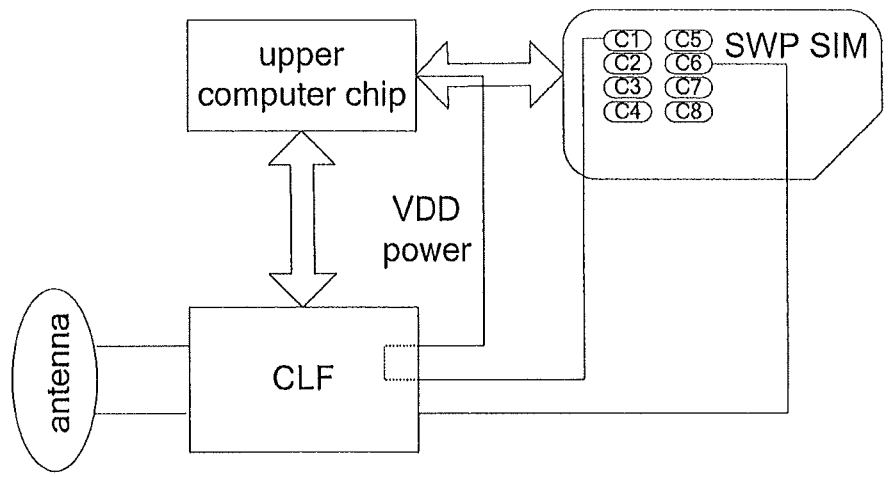
FIG. 2 schematically illustrates a connection of a contactless front element and a security element in a conventional solution.
Figure 3:
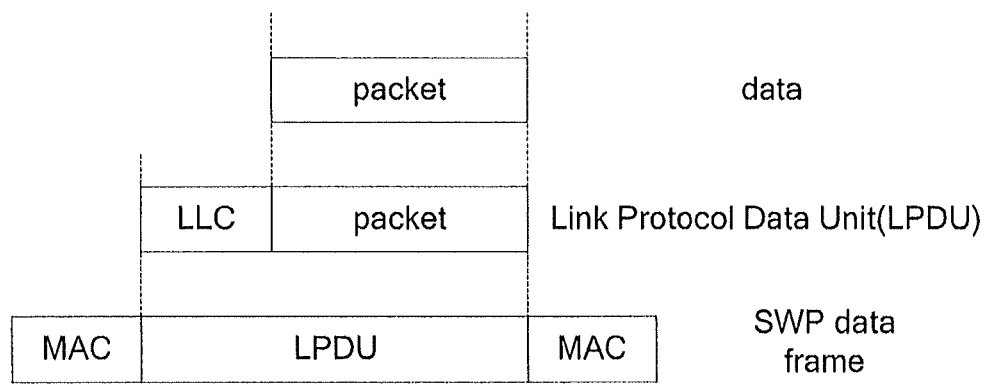
FIG. 3 schematically illustrates a structure of a SWP data frame in a conventional solution.
Figure 4:
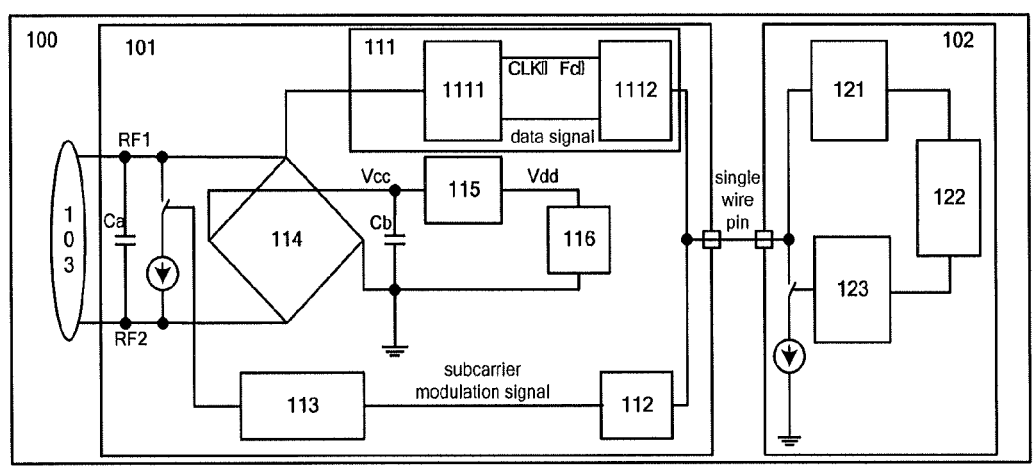
FIG. 4 schematically illustrates a structure of a data transmission apparatus according to one embodiment of the present disclosure.

FIG. 4 schematically illustrates a structure of a data transmission apparatus according to one embodiment of the present disclosure. The data transmission apparatus 100 may include a contactless front element 101 and a security element 102 connected with the contactless front element 101 through a single wire.

The contactless front element 101 may be configured to process a contactless RF interface and a communication protocol. The contactless front element 101 and an antenna 103 connected with it form an interface to communicate with a proximity coupling device. The interface may realize reception and sending of commands and data through a RF transmission following a standard communication protocol ISO14443.

The security element 102 may be configured to process all kinds of applications in an emulation of a PICC, including dealing with the commands set of ISO14443-3, such as ATQ (Answer To Request) command, anticollision command and select command. The security element 102 may further be configured to manage and process data, for example, it may manage UID and process other application data.

Since processing of all kinds of applications and data management in the emulation of a PICC are completed by the security element 102, the safety problems brought by storing secret information, such as the UID, in the contactless front element can be avoided.

The contactless front element 101 may include a first signal generating element 111, a second signal demodulation element 112, a load modulation circuit 113, a rectifier circuit 114, a power supply regulator circuit 115 and other circuits 116. An output port of the antenna 103 may be connected with an input port of the first signal generating element 111. In the contactless front element 101, an output port of the first signal generating element 111 may be connected with an input port of the second signal demodulation element 112 and an output port of the second signal demodulation element 112 may be connected with an input port of the load modulation circuit 113. Then an output port of the load modulation circuit 113 may be connected with an input port of the antenna 103 through a switching circuit (not shown). Other circuits 116 may control the rectifier circuit 114 by controlling the power supply regulator circuit 115 to provide power supply to the whole data transmission apparatus 100. For brevity, connections between other circuits 116 and the first signal generating element 111 and the load modulation circuit 113 in FIG. 4 are not shown.

The first signal generating element 111 may be configured to demodulate and electrically process signals received by the antenna 103. The first signal generating element 111 may include a clock recovery and demodulation circuit 1111 and a logic processing circuit 1112. The logic processing circuit 1112 may process input clock signals and demodulated signals in real time to generate coded signals which are adapted to be transmitted through a single wire, have all contactless information and synchronize with external contactless signals. The clock recovery and demodulation circuit 1111 has two output ports which output recovered clock signals and demodulated signals, such as Miller signal, respectively. The logic processing circuit 1112 has two input ports. Two output ports of the clock recovery and demodulation circuit 1111 may be connected with two input ports of the logic processing circuit respectively. An output port of the logic processing circuit 1112 may be the output port of the first signal generating element 111.

The security element 102 may include a first signal demodulation element 121, a main processing element 122 and a second signal generating element 123. An output port of the first signal demodulation element 121 may be connected with an input port of the main processing element 122 and an output port of the main processing element 122 may be connected with an input port of the second signal generating element 123.

In security element 102, after an input port of the first signal demodulation element 121 is connected with an output port of the second signal generating element 123, the two elements are connected with the output port of the first signal generating element 111 and the second signal demodulation element 112 of the contactless front element 101 through a single wire.

The abovementioned apparatus may implement a new method for data transmission, which reduces a data transmission delay between a contactless front element 101 and a security element 102 so that data can be transmitted transparently by the contactless front element 101 between the security element 102 and a proximity coupling device.

Figure 5:
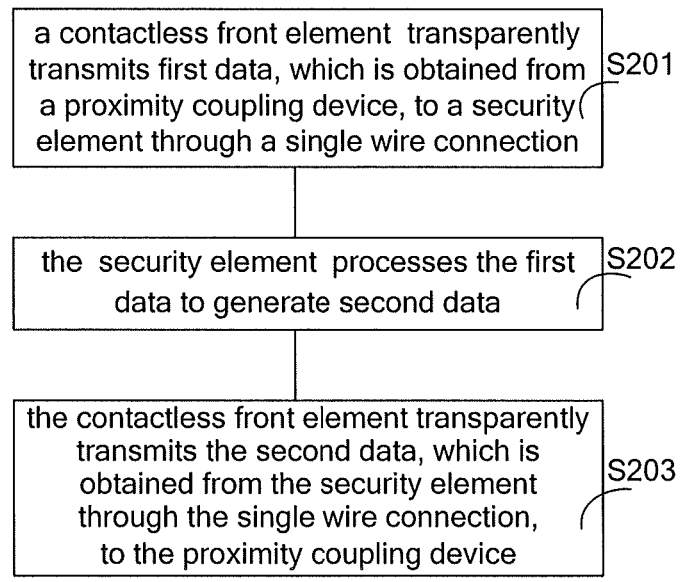
FIG. 5 schematically illustrates a flow chart of a method for data transmission according to one embodiment of the present disclosure.

As shown in FIG. 5, one embodiment of the present disclosure may provide a method for data transmission. The method may include steps of:

S201, a contactless front element 101 transparently transmits first data, which is obtained from a proximity coupling device, to a security element 102 through a single wire connection;

S202, the security element 102 processes the first data to generate second data; and S203, the contactless front element 101 transparently transmits the second data, which is obtained from the security element 102 through the single wire connection, to the proximity coupling device.

Figure 6:
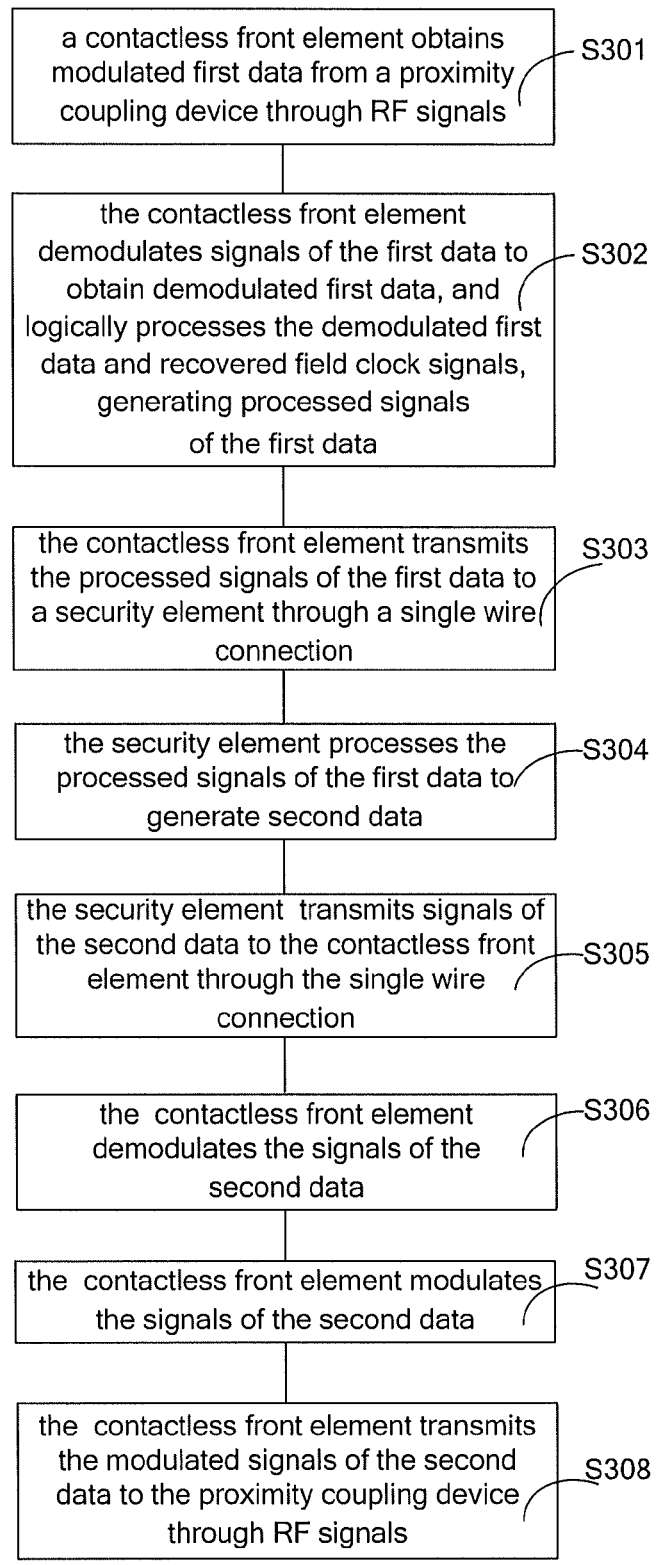
FIG. 6 schematically illustrates a method for data transmission according to another embodiment of the present disclosure.

As shown in FIG. 6, another embodiment of the present disclosure may provide a method for data transmission. The method may include steps of:

S301, a contactless front element 101 obtains modulated first data from a proximity coupling device through RF signals;

S302, the contactless front element 101 demodulates signals of the first data to obtain demodulated first data and logically processes the demodulated first data and recovered field clock signals, generating processed signals of the first data;

S303, the contactless front element 101 transmits the processed signals of the first data to a security element 102 through a single wire connection;

S304, the security element 102 processes the processed signals of the first data to generate second data;

S305, the security element 102 transmits signals of the second data to the contactless front element 101 through the single wire connection;

S306, the contactless front element 101 demodulates the signals of the second data;

S307, the contactless front element 101 modulates the signals of the second data; and S308, the contactless front element 101 transmits the modulated signals of the second data to the proximity coupling device through RF signals.

Hereafter, the abovementioned method will be described in detail.

First, in Step S301, a contactless front 101 obtains modulated first data from a proximity coupling device through RF signals. Signals both sent and received by the proximity coupling device may meet a standard, such as modulated signals on ISO14443 standard. The modulated signals may be received by the antenna 103 through a RF transmission.

Afterward, in Step S302, the contactless front element 101 demodulates signals of the first data to obtain demodulated first data and logically processes the demodulated first data with field clock signals. A clock recovery and demodulation circuit 1111 in the contactless front element 101 may output field clock signals and demodulated signals, such as Miller envelope signals, respectively. A logic AND circuit 1112 in the contactless front element 101 then logically processes the field clock signals and the demodulated signals to generate processed signals of the first data which are logic signals similar with field signals sent by the proximity coupling device.

Afterward, in Step S303, the contactless front element 101 transmits the processed signals of the first data to a security element 102 through a single wire connection.

Therefore, the data sent from the contactless front element 101 to the security element 102 and the field signals sent by the proximity coupling device meet a same standard (such as, ISO14443 standard). That is to say, different from the conventional solutions, the contactless front element 101 does not pack first data again to form signals which meet other standards (such as, SWP standard). Thus, the contactless front element 101 forms a transparent channel between the proximity coupling device and the security element 102, which causes data to be transmitted between the proximity coupling device and the security element 102 transparently. In this manner, a second-time packing of first data is avoided and problems of transmission delay brought by an increment of a data volume after the packing are solved. Therefore, the security element 102 may be used to respond to all the commands of proximity coupling device and process all the data during an emulation of PICC and safety problems of saving the UID, brought by the contactless front element processing part of proximity coupling device commands, can be avoided.

Besides, the contactless front element 101 is connected with the security element 102 through a single wire connection, which remains the situation that a SIM card is used as the security element 102 unchanged.

Hereinafter, in Step S304, the security element 102 processes the processed signals of the first data to generate second data. First, a first signal demodulation element 121 in the security element 102 demodulates the modulated signals of the first data formed in the Step S302; then a main processing element 122 in the security element 102 responds to the proximity coupling device commands to generate second data, which are the data to be output to the proximity coupling device by the emulation of a PICC; and a second signal generating element 123 in the security element 102 modulates the second data.

Hereinafter, in Step S305, the security element 102 transmits signals of the second data to the contactless front element 101 through the single wire connection. The transmission is realized by the single wire connection between the security element 102 and the contactless front element 101 as well in this step.

Afterwards, in Step S306, the contactless front element 101 demodulates the signals of the second data to obtain the second data. Namely, the second data modulated by the security element 102 during an emulation of the PICC are demodulated so that the demodulated second data can be modulated again to meet the requirement of being transmitted to the proximity coupling device.

After that, in Step S307, the contactless front element 101 modulates the demodulated second data. Namely, the demodulated data are modulated to become signals which can be received by proximity coupling device through RF.

During processing the second data transmitted from the security element 102 to the proximity coupling device, instead of unpacking packed SWP frame data in conventional solutions, the contactless front element 101 only simply demodulates and modulates the second data. Therefore, the second data is transmitted transparently from the security element 102 to the proximity coupling device by the contactless front element 101, which avoid time-lag problems caused by unpacking packed SWP frame data in conventional solutions.

Last, in Step S308, the contactless front element 101 transmits the modulated second data to the proximity coupling device through RF signals.

Based on Step S301 to S308, a whole process of completely simulating a PICC by a contactless front-security element architecture is completed.

In conclusion, in the method and apparatus for data transmission according to above embodiments of the present disclosure, data is transmitted transparently in real time and data transmitted between a contactless front element and a security element are synchronous to data transmitted in an external proximity coupling device. And a fixed delay of the contactless front element may meet a requirement, stipulated by a contactless standard, of frame delay from a proximity coupling device to a PICC.

Although the present disclosure has been disclosed as above with reference to preferred embodiments thereof but will not be limited thereto. Those skilled in the art can modify and vary the embodiments without departing from the spirit and scope of the present disclosure. Accordingly, without departing from the scope of the present invented technology scheme, whatever simple modification and equivalent variation belong to the protection range of the present invented technology scheme.

What is claimed is:

1. A method for data transmission, comprising:
   a contactless front element transparently transmitting first data, which is obtained from a proximity coupling device, to a security element through a single wire connection without packing the first data, wherein the first data comprises commands of International Organization for Standardization 14443-3 standard;
   the security element processing the first data to generate second data; and
   the contactless front element transparently transmitting the second data, which is obtained from the security element through the single wire connection, to the proximity coupling device without unpacking the second data.

2. The method for data transmission according to claim 1, further comprising: the contactless front element obtaining modulated first data from the proximity coupling device through radio frequency signals.

3. The method for data transmission according to claim 2, further comprising: generating coded signals, which comprise complete real-time contactless information, through logically processing field clock signals and demodulated first data generated by a clock recovery and demodulation circuit in the contactless front element, and transparently transmitting the coded signals to security element.

4. The method for data transmission according to claim 1, further comprising: the contactless front element transmitting the second data to the proximity coupling device through radio frequency signals.

5. The method for data transmission according to claim 4, further comprising: the contactless front element modulating signals of the second data to obtain modulated second data and transmitting the modulated second data to the proximity coupling device.

6. The method for data transmission according to claim 1, wherein the transparent transmission is a real-time transmission.

7. The method for data transmission according to claim 1, further comprising: data transmitted between the contactless front element and the security element are synchronous to data transmitted between the contactless front element and the proximity coupling device.

8. A data transmission apparatus, comprising: a contactless front element and a security element connected with the contactless front element through a single wire, wherein the contactless front element is configured to transparently transmit data between the security element and an external proximity coupling device,
   wherein the contactless front element comprises a first signal generating element and a second signal demodulation element, and the security element comprises a first signal demodulation element and a second signal generating element, where the output port of the first signal generating element, the input port of the second signal demodulation element, the input port of the first signal demodulation element and the output port of the second signal generating element are electrically connected.

9. The data transmission apparatus according to claim 8, wherein the transparent transmission is a real-time transmission.

10. The data transmission apparatus according to claim 8, where data transmitted between the contactless front element and the security element are synchronous to data transmitted between the contactless front element and the external proximity coupling device.

11. The data transmission apparatus according to claim 8, where a fixed delay of the contactless front element meets the requirement of frame delay time between the proximity coupling device and the proximity integrated circuit card, following the contactless standard.

12. The data transmission apparatus according to claim 8, wherein the first signal generating element comprises a clock recovery and demodulation circuit and a logic processing circuit, where two output ports of the clock recovery and demodulation circuit are connected with two input ports of the logic processing circuit respectively and the output port of the logic processing circuit is the output port of the first signal generating element.

13. The data transmission apparatus according to claim 8, wherein the security element further comprises a main processing element, where the output port of the first signal demodulation element is connected with the input port of the main processing element, and the output port of the main processing element is connected with the input port of the second signal generating element.

14. The method according to claim 2, wherein the security element processing the first data to generate second data comprises:
 demodulating the modulated first data;
 responding to commands of the proximity coupling device to generate the second data; and
 modulating the second data to obtain modulated second data.

15. The method according to claim 3, wherein the coded signals and the modulated first data meet a same standard.

* * * * *